United States Patent Office 3,022,226
Patented Feb. 20, 1962

3,022,226
PROCESS FOR PREPARING 1-DEHYDRO STEROIDS
John W. Ross, East Brunswick, N.J., assignor to Olin Mathieson Chemical Corporation, New York, N.Y., a corporation of Virginia
No Drawing. Filed Nov. 23, 1960, Ser. No. 71,140
6 Claims. (Cl. 195—51)

This invention relates to a process for preparing steroids and, more particularly, to an improved process for the microbial 1-dehydrogenation of steroids.

With the discovery that the introduction of a double bond into the 1,2-position of hydrocortisone increased the glucocorticoid activity, attention was directed to processes for 1-dehydrogenation of steroids of the 3,20-diketo-$\Delta^4$-pregnene series. Subsequently other 1-dehydrogenated steroids were found to have commercial utility as glucocorticoid and anti-inflammatory drugs. Among such steroids can be mentioned triamcinolone and dexamethasone. It was also found that the desired 1-dehydrogenation could be accomplished either chemically or microbiologically. Chemical methods, such as by the use of selenium dioxide, however, suffered the disadvantage of giving a selenium containing by-product which was difficult to remove. Microbial methods, although superior, have hithertofor been accompanied by substantial reduction of the keto group in the 20-position to yield an undesired 20-hydroxy derivative.

It is an object of this invention, therefore, to provide an improved process for 1-dehydrogenating a steroid of the 3,20-diketo-$\Delta^4$-pregnene series.

It is another object of this invention to provide a process for 1-dehydrogenating a steroid of the 3,20-diketo-$\Delta^4$-pregnene series wherein the concomitant reduction of the 20-keto group to a 20-hydroxy group is minimized or eliminated.

These objects are achieved by the process of this invention which comprises subjecting under aerobic conditions a steroid of the 3,20-diketo-$\Delta^4$-pregnene series to the action of a 1-dehydrogenase enzyme in the presence of an iodoacetate compound. For this purpose there is used iodoacetic acid itself; a salt thereof, such as an alkali metal salt (e.g., sodium iodoacetate and potassium iodoacetate), an alkaline earth metal salt, the ammonium salt, and an amine salt; or an ester thereof, such as a lower alkyl ester (e.g., methyl iodoacetate and ethyl iodoacetate) and a monocyclic aralkyl ester.

The 1-dehydrogenase enzyme utilized in the process of this invention is preferably prepared separately in an initial step wherein a microorganism known to effect 1-dehydrogenation of steroids is grown in a suitable aqueous nutrient medium containing a substance which induces the formation of the desired 1-dehydrogenase enzyme. Suitable inducing substances include steroids saturated in the 1,2-position. Although any such steroid may be used, because of their low cost testosterone and progesterone are particularly preferred for this purpose.

Suitable microorganisms include those known to effect 1-dehydrogenation of steroids as exemplified by members of the genera: Corynebacterium (e.g., *C. simplex*), Nocardia (e.g., *N. aurantia* and *N. asteroides*), Bacterium (e.g., *B. cyclooxydans*), Mycobacterium (e.g., *M. rhodochrous*), Bacillus (e.g., *B. sphaericus*), Septomyxa (e.g., *S. affinis*), Didymella (e.g., *D. lycopersici*), Calonectria (e.g., *C. decora*), Fusarium (e.g., *F. solani*), Cylindrocarpon (e.g., *C. radicicola*), Pseudomonas (e.g., *P. testosteroni*), Streptomyces (e.g., *S. lavendulae*), and also selected species of the genera Protaminobacter, Alcaligenes, Alternaria, Ophiobolus and Pyinodithis.

In general, the conditions of culturing the microorganisms for the purpose of preparing the 1-dehydrogenase is the same as those of culturing microorganisms for the production of antibiotics or vitamins. Thus, the microorganism is grown in contact with (in or on) a suitable nutrient medium. If an aerobic microorganism is being grown, an adequate supply of oxygen (air) is provided during the growth period. A suitable nutrient medium essentially comprises a source of nitrogenous factors and an assimilable source of carbon and energy. The latter may be a carbohydrate, such as sucrose, molasses, glucose, maltose, starch or dextrin. The source of nitrogenous factors may be organic (e.g., soybean meal, corn steep liquor, meat extract, distiller's solubles, peptones and/or yeast extract) or synthetic (i.e., composed of simple, synthesizable organic and inorganic compounds such as ammonium salts, alkali nitrates, amino acids or urea).

In order to induce the formation of the desired 1-dehydrogenase enzyme, a 1,2-saturated steroid, such as progesterone and testosterone, is also added to the nutrient medium. The steroid is present in sufficient quantity to favor optimum formation of the desired enzyme and preferably is present in a concentration of at least 0.01% (w./v.) of the nutrient medium.

After a suitable growth period (at least 24 hours), the cells are separated from the nutrient medium in the usual manner, such as by filtration or centrifugation, and the separated cells containing the desired 1-dehydrogenase are then mixed with water, an iodoacetate and the steroid to be 1-dehydrogenated, under aerobic conditions.

Among the steroids of the 3,20-diketo-$\Delta^4$-pregnene series which may be converted into useful 1-dehydro derivatives by the practice of this invention may be mentioned monohydroxyprogesterones (e.g., 11$\alpha$-hydroxyprogesterone, the 9$\alpha$- and 12$\alpha$-halo-11$\beta$-hydroxyprogesterones, desoxycorticosterone and 21-fluoro-17$\alpha$-hydroxyprogesterone); the dihydroxyprogesterones (e.g., corticosterone, the 9$\alpha$- and 12$\alpha$-halocorticosterones, Reichsteins's Compound S, 11$\beta$,17$\alpha$-dihydroxyprogesterone, cortisone, the 9$\alpha$- and 12$\alpha$-halocortisones, 21-fluoro-11$\beta$,17$\alpha$-dihydroxyprogesterone and 9$\alpha$,21-difluoro-11$\beta$,17$\alpha$-dihydroxyprogesterone); the trihydroxyprogesterones (e.g., hydrocortisone, $\Delta^4$-pregnene-11$\alpha$,17$\alpha$,21-triol-3,20-dione, the 9$\alpha$- and 12$\alpha$-halohydrocortisones, and the 16-methyl-9$\alpha$-halohydrocortisones); and the tetrahydroxyprogesterones (e.g., 9$\alpha$-fluoro-16$\alpha$-hydroxyhydrocortisone, 6-methyl-9$\alpha$-fluoro-16$\alpha$-hydroxyhydrocortisone and the 6,9-dihalo-16$\alpha$-hydroxyhydrocortisones); as well as the 21-ester derivatives of those steroids containing a 21-hydroxyl group (e.g., Compound S acetate, hydrocortisone acetate, 9$\alpha$-fluorohydrocortisone acetate and 9$\alpha$-fluorocortisone acetate). The preferred 21-esters are those of hydrocarbon carboxylic acids having less than ten carbon atoms as exemplified by the lower fatty acids (e.g., acetic and propionic acids), the monocyclic aryl carboxylic acids (e.g., benzoic and $\alpha$-toluic acids), the monocyclic aryl lower alkanoic acids (e.g., phenacetic and $\beta$-phenylpropionic acids), the cycloalkane carboxylic acids and the cycloalkene carboxylic acids.

Although the process of this invention is being described as one employing separated cells, the process can also be carried out using either isolated 1-dehydrogenase enzyme or the entire nutrient medium containing the desired microorganism. However, because of the extra cost involved in isolating the former and the difficulty of inhibiting undesired enzyme action in the latter, the preferred method is, as hereinbefore stated, one where the desired microorganism is first cultured and the separated cells containing 1-dehydrogenase enzyme are then used to effect 1-dehydrogenation.

To carry out the process of this invention the separated cells are suspended in an aqueous medium and the iodoacetate compound and steroid to be converted are added to the medium, the steroid preferably being added either after or with the iodoacetate compound, and the iodoacetate compound being added in a preferred concentration of about 0.001 molar to about 0.1 molar and optimally about 0.005 molar to about 0.02 molar. An adequate supply of oxygen is also provided, preferably either by aerating or agitating the mixture, or both.

The following examples are illustrative of the invention (all temperatures being in centigrade):

EXAMPLE 1

Triamcinolone (a) *Preparation of cells.*—Surface growth from an agar slant (beef extract, 1.5 g.; yeast extract, 3 g.; peptone, 6 g.; dextrose, 1 g.; agar, 20 g.; distilled water to 1 liter) culture of *Bacterium cyclo-oxydans* (A.T.C.C. No. 12,673) is used to inoculate 50 ml. portions of the following medium (A) contained in three 250 ml. Erlenmeyer flasks:

| | Percent |
|---|---|
| Glucose | 3 |
| Peptone | 1 |
| Yeast extract | 0.25 |
| $KH_2PO_4$ | 0.1 |
| Ucon antifoam (a polyalkylene glycol) | 0.01 | in distilled water, pH adjusted to 7.0 before autoclaving at 121° for 30 minutes.

The inoculated flasks are incubated at 25° with rotary shaking at 280 cycles per minute in a radius of about one inch. After 48 hours, each flask is emptied into a four liter flask containing one liter of the same medium (A). Incubation is continued as described above for 48 hours after which the contents of the three flasks are used to inoculate 20 liters of the same medium (A) in a 30 liter stainless steel baffled tank. To this tank is also added 6 g. of progesterone dissolved in 120 ml. of chloroform. The tank medium is agitated by an impeller running at 220 r.p.m. and is aerated at the rate of 2.3 cubic feet per minute. After 48 hours incubation, the cells are harvested by centrifugation and the cell paste obtained is frozen. These cells have 1-dehydrogenase activity.

(b) *Steroid dehydrogenation.*—A mixture of 1 g. of the cell paste (wet weight) obtained in step (a), 10 mmoles of $Na_2HPO_4$, 0.8 mmole of sodium iodoacetate and sufficient water to make 30 ml. in a 250 ml. Erlenmeyer flask is adjusted to pH 7.8 with N sulfuric acid and incubated at 30° for 20 minutes. 10.8 mg. of 9α-fluoro-16α-hydroxyhydrocortisone, dissolved in 0.176 ml. of dimethyl formamide plus 20 ml. of water is then added. The resulting mixture is incubated at 30° for two hours while shaking at 250 c.p.m. on a rotary shaker with a three-quarter inch stroke. 5 ml. of the resulting mixture is removed, treated with 0.2 ml. of 10 N sulfuric acid and extracted with 2 ml. of methyl isobutyl ketone. The extract is then analyzed for steroid content by paper chromatography which reveals a 77% yield of triamcinolone.

By way of contrast, if the sodium iodoacetate is omitted in step (b) of Example 1, the yield of triamcinolone is decreased from 77% to 68% and the yield of total triamcinolone and starting steroid (i.e., 9α-fluoro-16α-hydroxyhydrocortisone) recovered decreased from 97% to 73%.

EXAMPLE 2

Following the procedure of Example 1, step (b) but adjusting the initial mixture to pH 8.8, the temperature to 35° and the sodium iodoacetate to 0.25 mmole in 50 ml. of final volume, triamicinolone is obtained in a 78% yield.

If the sodium iodoacetate is omitted in Example 2, the yield of triamcinolone is decreased from 78% to 62% and the yield of total triamcinolone and starting steroid recovered from 99% to 67%.

EXAMPLE 3

Prednisolone

Following the procedure of Example 1, step (b) but substituting 10 mg. of hydrocortisone for the 9α-fluoro-16α-hydroxyhydrocortisone, prednisolone is obtained.

The invention may be variously otherwise embodied within the scope of the appended claims.

What is claimed is:

1. A process for preparing a 1-dehydro steroid which comprises subjecting under aerobic conditions a steroid of the 3,20-diketo-$\Delta^4$-pregnene series to the action of a 1-dehydrogenase enzyme in the presence of an iodoacetate compound selected from the group consisting of iodoacetic acid, salts thereof and esters thereof, said iodoacetate compound being present in a molar concentration of at least about 0.001.

2. The process of claim 1 wherein the iodoacetate compound is an alkali metal iodoacetate.

3. The process of claim 1 wherein the iodoacetate compound is sodium iodoacetate.

4. The process of claim 1 wherein the steroid is 9α-fluoro-16α-hydroxyhydrocortisone.

5. The process of claim 1 wherein the steroid is hydrocortisone.

6. The process of claim 1 wherein the 1-dehydrogenase enzyme is prepared by culturing a 1-dehydrogenating strain of a microorganism in the presence of a 1,2-saturated steroid.

References Cited in the file of this patent

UNITED STATES PATENTS

| 2,844,513 | Wettstein et al. | July 22, 1958 |
| 2,951,016 | Charney | Aug. 30, 1960 |

OTHER REFERENCES

Bergey's Manual, 7th edition, The Williams and Wilkins Co., Baltimore, Md., 1957, page 1018; POSL.